(12) United States Patent
Robichaud et al.

(10) Patent No.: US 9,431,008 B2
(45) Date of Patent: Aug. 30, 2016

(54) MULTIPLE PARALLEL DIALOGS IN SMART PHONE APPLICATIONS

(71) Applicant: Nuance Communications, Inc., Burlington, MA (US)

(72) Inventors: Jean-Philippe Robichaud, Mercier (CA); Matthieu Hebert, Melocheville (CA)

(73) Assignee: Nuance Communications, Inc., Burlington, MA (US)

( * ) Notice: Subject to any disclaimer, the term of this patent is extended or adjusted under 35 U.S.C. 154(b) by 286 days.

(21) Appl. No.: 13/904,269

(22) Filed: May 29, 2013

(65) Prior Publication Data

US 2014/0358545 A1  Dec. 4, 2014

(51) Int. Cl.
*G10L 15/18* (2013.01)
*G10L 15/22* (2006.01)

(52) U.S. Cl.
CPC ............ *G10L 15/18* (2013.01); *G10L 2015/225* (2013.01); *G10L 2015/228* (2013.01)

(58) Field of Classification Search
CPC ... G10L 15/22; G10L 15/183; G10L 15/1822; G10L 15/19; G10L 15/193
See application file for complete search history.

(56) References Cited

U.S. PATENT DOCUMENTS

| | | | | |
|---|---|---|---|---|
| 5,615,296 | A * | 3/1997 | Stanford et al. | 704/270.1 |
| 5,651,096 | A * | 7/1997 | Pallakoff et al. | 704/275 |
| 5,774,860 | A * | 6/1998 | Bayya et al. | 704/275 |
| 5,794,189 | A * | 8/1998 | Gould | 704/231 |
| 5,873,107 | A * | 2/1999 | Borovoy | G06F 17/276 |
| | | | | 707/999.003 |
| 6,167,377 | A * | 12/2000 | Gillick et al. | 704/240 |
| 6,173,266 | B1 * | 1/2001 | Marx et al. | 704/270 |
| 6,233,559 | B1 * | 5/2001 | Balakrishnan | 704/275 |
| 6,311,159 | B1 * | 10/2001 | Van Tichelen | G10L 15/18 |
| | | | | 704/251 |
| 6,418,440 | B1 * | 7/2002 | Kuo et al. | |
| 6,970,935 | B1 * | 11/2005 | Maes | 709/230 |
| 7,016,847 | B1 * | 3/2006 | Tessel et al. | 704/275 |
| 7,069,254 | B2 * | 6/2006 | Foulger | G06F 17/3064 |
| | | | | 706/12 |
| 7,137,126 | B1 * | 11/2006 | Coffman et al. | 719/328 |
| 7,206,747 | B1 * | 4/2007 | Morgan | 704/251 |
| 7,224,346 | B2 * | 5/2007 | Sheng | G06F 17/273 |
| | | | | 345/169 |
| 7,451,152 | B2 * | 11/2008 | Kraft | G06F 17/30528 |
| 7,512,904 | B2 * | 3/2009 | Matthews | G06F 3/0482 |
| | | | | 715/733 |

(Continued)

OTHER PUBLICATIONS

Lin, Bor-shen, Hsin-min Wang, and Lin-shan Lee. "A distributed architecture for cooperative spoken dialogue agents with coherent dialogue state and history." Asru. vol. 99. 1999.*

(Continued)

*Primary Examiner* — Fariba Sirjani
(74) *Attorney, Agent, or Firm* — Banner & Witcoff, Ltd.

(57) ABSTRACT

An arrangement is described for conducting natural language dialogs with a user on a mobile device using automatic speech recognition (ASR) and multiple different dialog applications. A user interface provides for user interaction with the dialogue applications in natural language dialogs. An ASR engine processes unknown speech inputs from the user to produce corresponding speech recognition results. A dialog concept module develops dialog concept items from the speech recognition results and stores the dialog concept items and additional dialog information in a dialog concept database. A dialog processor accesses dialog concept database information and coordinates operation of the ASR engine and the dialog applications to conduct with the user a plurality of separate parallel natural language dialogs in the dialog applications.

17 Claims, 8 Drawing Sheets

(56) References Cited

U.S. PATENT DOCUMENTS

| | | | | |
|---|---|---|---|---|
| 7,555,713 | B2* | 6/2009 | Yang | G06F 17/248 434/178 |
| 7,562,082 | B2* | 7/2009 | Zhou | G06F 17/274 |
| 7,599,915 | B2* | 10/2009 | Hill | G06F 17/30873 |
| 7,676,517 | B2* | 3/2010 | Hurst-Hiller | G06F 17/30395 707/713 |
| 7,774,713 | B2* | 8/2010 | Mital | G06F 9/4443 715/763 |
| 7,953,730 | B1* | 5/2011 | Bleckner | G06F 17/30864 707/722 |
| 8,326,622 | B2* | 12/2012 | Kraenzel et al. | 704/235 |
| 8,719,034 | B2* | 5/2014 | Cross, Jr. | G10L 15/22 704/270 |
| 8,959,109 | B2* | 2/2015 | Scott | G06F 17/30637 707/769 |
| 9,043,709 | B2* | 5/2015 | Chae | G06F 3/0482 715/763 |
| 2001/0028368 | A1* | 10/2001 | Swartz | G06F 3/0481 715/835 |
| 2002/0135614 | A1* | 9/2002 | Bennett | 345/745 |
| 2002/0140741 | A1* | 10/2002 | Felkey et al. | 345/810 |
| 2002/0184023 | A1* | 12/2002 | Busayapongchai | H04M 3/4936 704/251 |
| 2003/0098891 | A1* | 5/2003 | Molander | G06F 3/0482 715/841 |
| 2003/0171928 | A1* | 9/2003 | Falcon et al. | 704/275 |
| 2003/0182131 | A1* | 9/2003 | Arnold | G10L 15/32 704/275 |
| 2003/0191627 | A1* | 10/2003 | Au | 704/9 |
| 2004/0166832 | A1* | 8/2004 | Portman | G06Q 30/02 455/412.1 |
| 2004/0215649 | A1* | 10/2004 | Whalen | G06F 8/10 |
| 2005/0033582 | A1* | 2/2005 | Gadd et al. | 704/277 |
| 2005/0080625 | A1* | 4/2005 | Bennett et al. | 704/249 |
| 2005/0120306 | A1* | 6/2005 | Klassen | G06F 3/0482 715/765 |
| 2005/0192804 | A1* | 9/2005 | Kitagawa et al. | 704/246 |
| 2006/0053016 | A1* | 3/2006 | Falcon et al. | 704/257 |
| 2007/0033005 | A1* | 2/2007 | Cristo et al. | 704/9 |
| 2007/0050191 | A1* | 3/2007 | Weider | G06F 17/30864 704/275 |
| 2007/0061148 | A1* | 3/2007 | Cross | G10L 15/22 704/275 |
| 2008/0048908 | A1* | 2/2008 | Sato | B60R 16/0373 342/200 |
| 2008/0091406 | A1* | 4/2008 | Baldwin | G10L 15/22 704/4 |
| 2008/0189110 | A1* | 8/2008 | Freeman | G06Q 30/0241 704/251 |
| 2009/0150156 | A1* | 6/2009 | Kennewick et al. | 704/257 |
| 2010/0146449 | A1* | 6/2010 | Brown | G06F 9/45512 715/835 |
| 2010/0218141 | A1* | 8/2010 | Xu | G06F 3/04817 715/834 |
| 2010/0312547 | A1* | 12/2010 | Van Os | G06F 3/167 704/9 |
| 2011/0054899 | A1* | 3/2011 | Phillips | G10L 15/30 704/235 |
| 2011/0106534 | A1* | 5/2011 | LeBeau | G01C 21/265 704/235 |
| 2011/0193726 | A1* | 8/2011 | Szwabowski et al. | 340/996 |
| 2011/0231798 | A1* | 9/2011 | Cok | G06Q 10/103 715/823 |
| 2011/0246944 | A1* | 10/2011 | Byrne | G06F 3/0489 715/835 |
| 2012/0023524 | A1* | 1/2012 | Suk | H04N 21/42222 725/43 |
| 2012/0185798 | A1* | 7/2012 | Louch | G06F 3/0481 715/796 |
| 2012/0209608 | A1* | 8/2012 | Lee | G10L 15/22 704/246 |
| 2012/0316871 | A1* | 12/2012 | Koll | G10L 15/30 704/231 |
| 2013/0054791 | A1* | 2/2013 | Oki | G06F 11/3409 709/224 |
| 2013/0169524 | A1* | 7/2013 | Han | G10L 21/00 345/156 |
| 2013/0226590 | A1* | 8/2013 | Lee | G06F 3/167 704/275 |
| 2013/0325460 | A1* | 12/2013 | Kim | G06F 3/167 704/231 |
| 2013/0346872 | A1* | 12/2013 | Scott | G06F 17/3064 715/738 |
| 2014/0095147 | A1* | 4/2014 | Hebert | G06F 17/2785 704/9 |
| 2014/0108019 | A1* | 4/2014 | Ehsani et al. | 704/275 |
| 2014/0136183 | A1* | 5/2014 | Hebert | G06F 17/30654 704/9 |
| 2014/0149920 | A1* | 5/2014 | Wang | G06F 3/0482 715/783 |
| 2014/0163959 | A1* | 6/2014 | Hebert | G06F 17/2785 704/9 |
| 2014/0164953 | A1* | 6/2014 | Lynch | H04L 51/046 715/753 |
| 2014/0189584 | A1* | 7/2014 | Weng | G06F 3/04883 715/808 |
| 2014/0195243 | A1* | 7/2014 | Cha | G06F 3/167 704/270.1 |
| 2014/0249821 | A1* | 9/2014 | Kennewick | G10L 15/22 704/257 |
| 2014/0257793 | A1* | 9/2014 | Gandrabur | G10L 15/22 704/9 |
| 2014/0278435 | A1* | 9/2014 | Ganong et al. | 704/275 |
| 2014/0297268 | A1* | 10/2014 | Govrin et al. | 704/9 |
| 2014/0297283 | A1* | 10/2014 | Hebert | G10L 15/18 704/257 |
| 2014/0358545 | A1* | 12/2014 | Robichaud | G10L 15/18 704/257 |
| 2015/0066479 | A1* | 3/2015 | Pasupalak | G06F 17/27 704/9 |
| 2015/0082175 | A1* | 3/2015 | Onohara | G06F 3/167 715/728 |
| 2015/0160907 | A1* | 6/2015 | Zhang | G06G 5/006 345/3.1 |

OTHER PUBLICATIONS

J.E. Kendall et al., "Information Delivery Systems: An Exploration of Web Pull and Push Technologies," Communications of the Association for Information Systems, vol. 1, Art. 14, Apr. 1999.*

* cited by examiner

MULTIPLE PARALLEL DIALOGS IN SMART PHONE APPLICATIONS

TECHNICAL FIELD

The invention generally relates to automatic speech recognition (ASR), and more specifically, to client-server ASR on mobile devices.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\operatorname{argmax}}\ P(W \mid A)$$

Given a system of statistical acoustic models, this formula can be re-expressed as:

$$\hat{W} = \underset{W}{\operatorname{argmax}}\ P(W)P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

U.S. Patent Publication 20110054899 describes a hybrid client-server ASR arrangement for a mobile device in which speech recognition may be performed locally by the device and/or remotely by a remote ASR server depending on one or more criteria such as time, policy, confidence score, network availability, and the like. An example screen shot of the initial prompt interface from one such mobile device ASR application, Dragon Dictation™ for iPhone™, is shown in FIG. 1A which processes unprompted speech inputs and produces representative text output. FIG. 1B shows a screen shot of the recording interface for Dragon Dictation™ for iPhone™. FIG. 1C shows an example screen shot of the results interface produced for the ASR results by Dragon Dictation™ for iPhone™.

FIG. 2 A-C shows some example screen shots of another mobile device application, Dragon Mobile Assistant™, which processes speech query inputs and obtains simultaneous search results from a variety of top websites and content sources. Such applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents). Currently, a dialog application such as Dragon Mobile Assistant™ can only handle one dialog task at a time. Once a dialog task is started, it must be finished or cancelled before another conversation can start. Performing two tasks that use the same objects means that anaphora need to be resolved, which is complicated for the user and on the server side. Also, it is impractical to make more than one task progress at the same time.

SUMMARY

Embodiments of the present invention are directed to an arrangement for conducting natural language dialogs with a user on a mobile device using automatic speech recognition (ASR) and multiple different dialog applications. A user interface provides for user interaction with the dialogue applications in natural language dialogs. An ASR engine processes unknown speech inputs from the user to produce corresponding speech recognition results. A dialog concept module develops dialog concept items from the speech recognition results and stores the dialog concept items and additional dialog information in a dialog concept database. A dialog processor accesses dialog concept database information and coordinates operation of the ASR engine and the dialog applications to conduct with the user a plurality of separate parallel natural language dialogs in the dialog applications.

The user interface may include multiple application selection tabs for user selection of a given active dialog application to interact with the user. The dialog concept items may include an indication of the dialog application in which they were originated. In a specific embodiment, there may be a domain expert agent for each dialog application to coordinate with the dialog processor to conduct a natural language dialog with the user in the associated dialog application. The dialog processor may push relevant dialog concept database information to the dialog applications and/or the dialog applications may pull relevant information from the dialog concept database.

DETAILED DESCRIPTION

Figure 1:
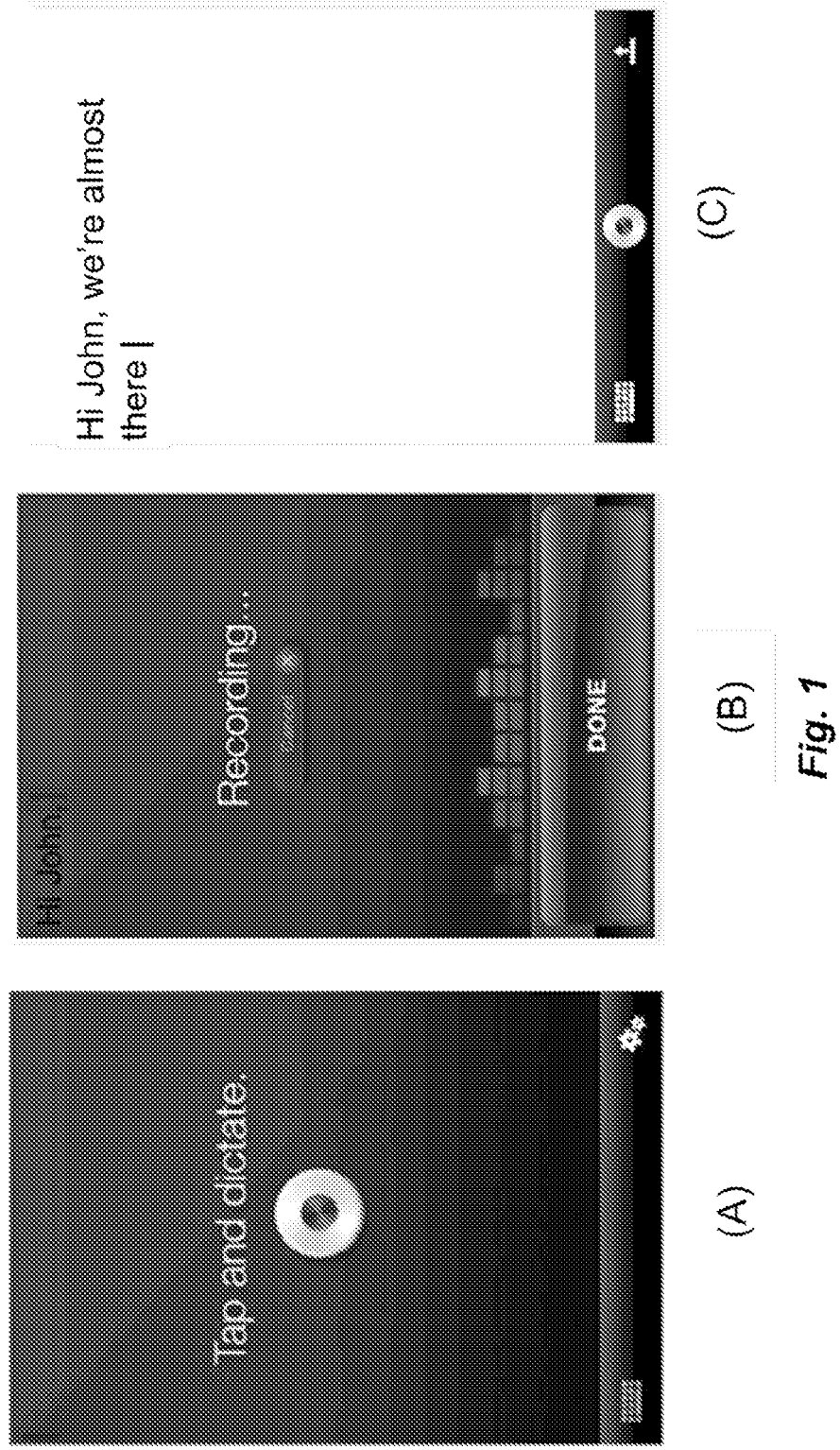
FIG. 1 A-C shows various example screen shots from a hybrid ASR application for a mobile device.
Figure 2:
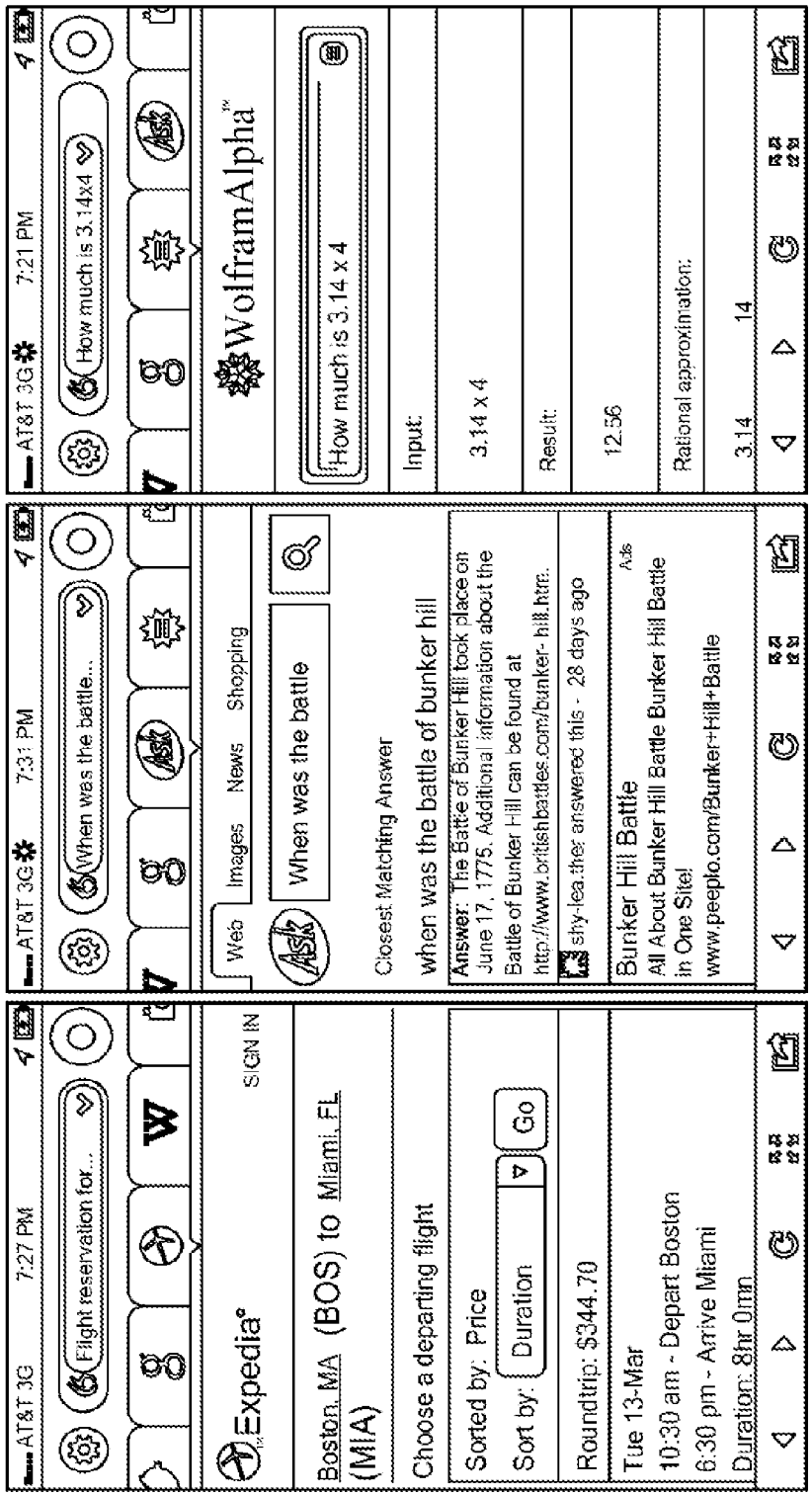
FIG. 2 A-C shows various example screens in a mobile device dialog application.
Figure 3:
FIG. 3 shows an example screen shot of a user interface for a mobile device according to an embodiment of the present invention.

Embodiments of the present invention are directed to an arrangement for conducting natural language dialogs with a user on a mobile device using automatic speech recognition (ASR) and multiple different dialog applications. For example, FIG. 3 shows an interactive display 301 for a mobile device with multiple user selectable tabs 302 which each correspond to one dialog thread being handled by one application agency. In this context, an agent can be thought of as a natural language module that acts on behalf of a given end application to interact with the user via the mobile device interface. An agent can itself be composed of a set of agents. Each agency is fed the natural language N-best list results and takes whatever information it can digest. Each piece of information can be kept as an atomic semantic object that registers the source (the "tab") it came from. These can be added to a global concept cloud that can be shared across agencies. (For example, see U.S. patent application Ser. No. 13/855,117, filed Apr. 2, 2013 and incorporated herein by reference.) It should be understood that embodiments of the present invention are not limited to what is specifically shown in the enclosed figures, and that there can be many different dialog interactions across many different end applications.

Figure 4:
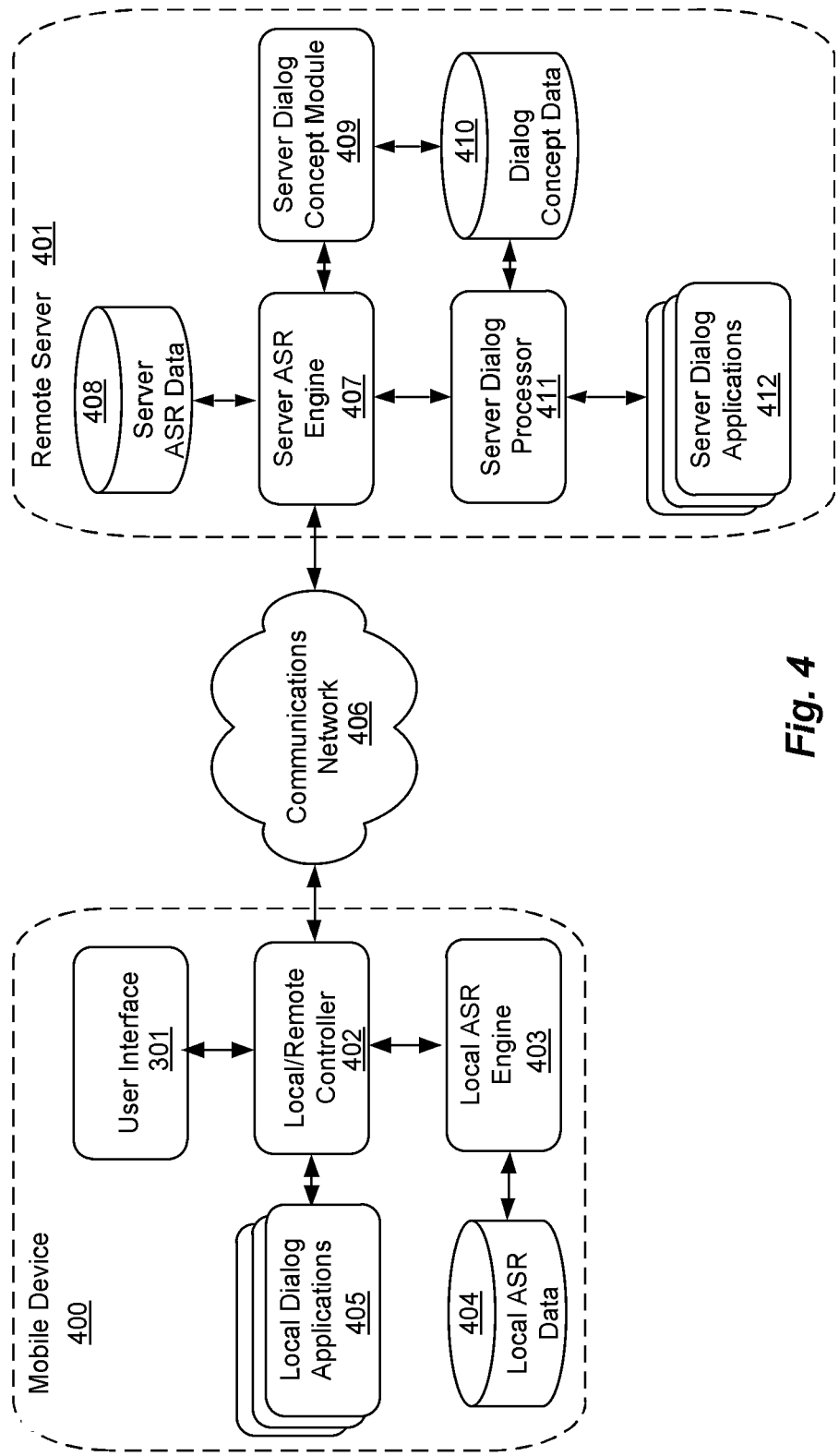
FIG. 4 shows various system elements in a multiple parallel dialog application arrangement according to an embodiment of the present invention.
Figure 5:
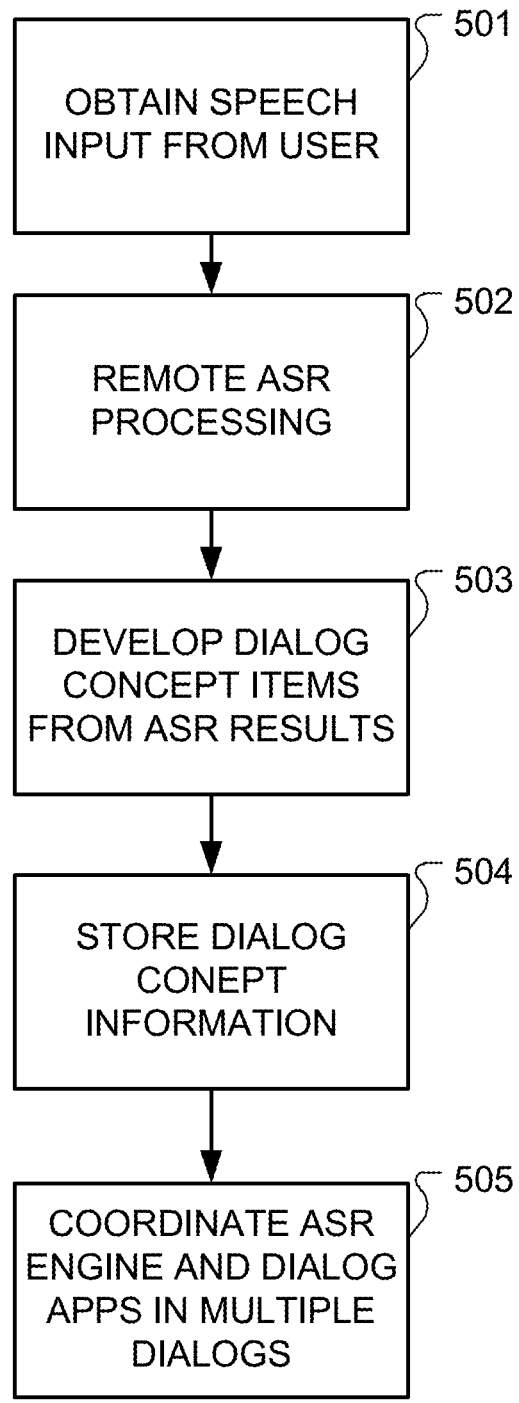
FIG. 5 shows functional steps in a multiple parallel dialog application arrangement according to an embodiment of the present invention.
Figure 6A:
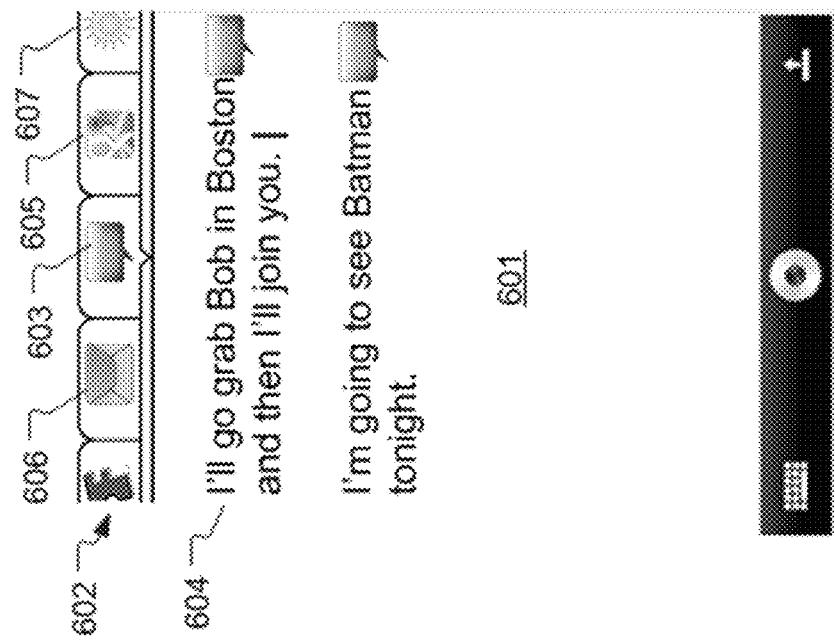
FIG. 6 A-F shows screen captures of a user interface in an example use case.
Figure 6B:
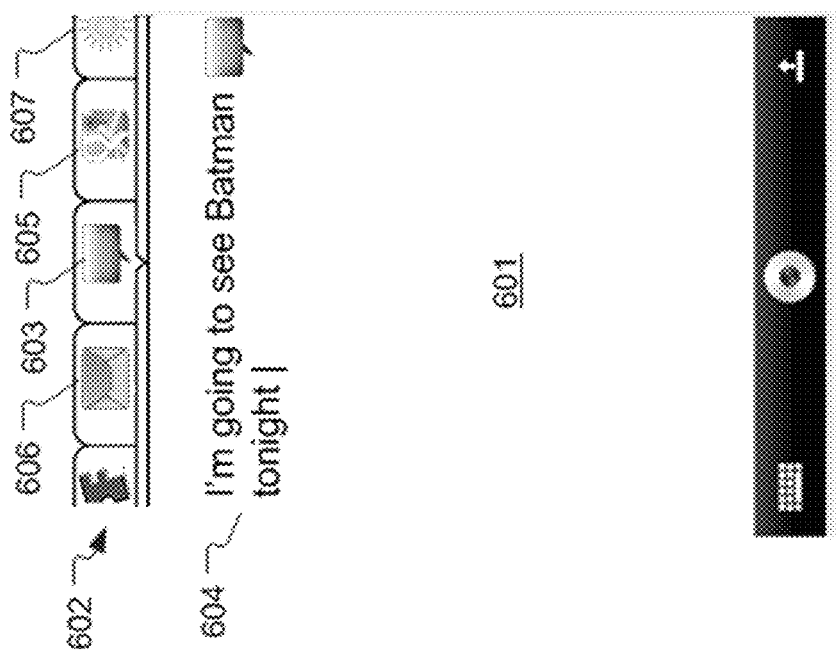
Figure 6D:
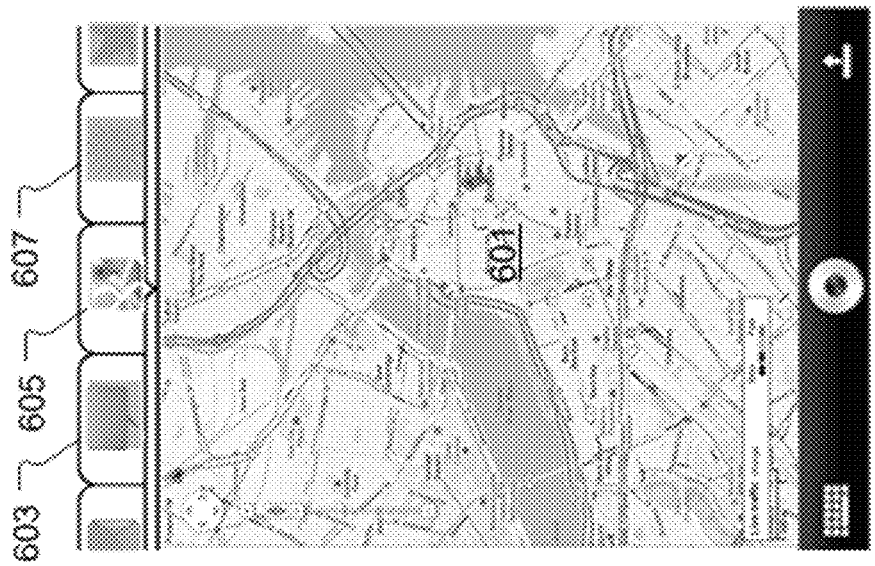
Figure 6C:
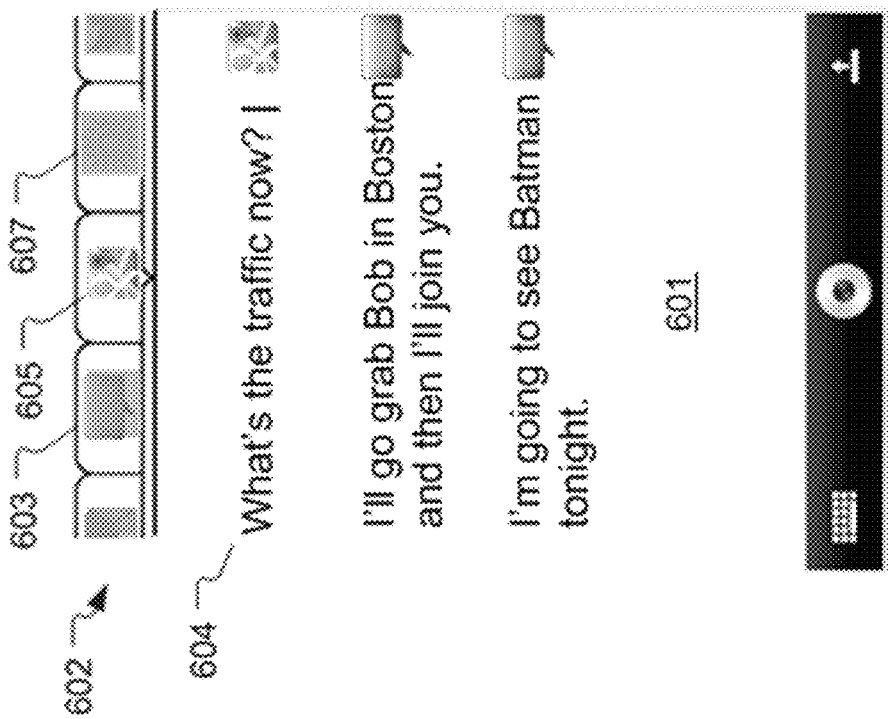
Figure 6F:
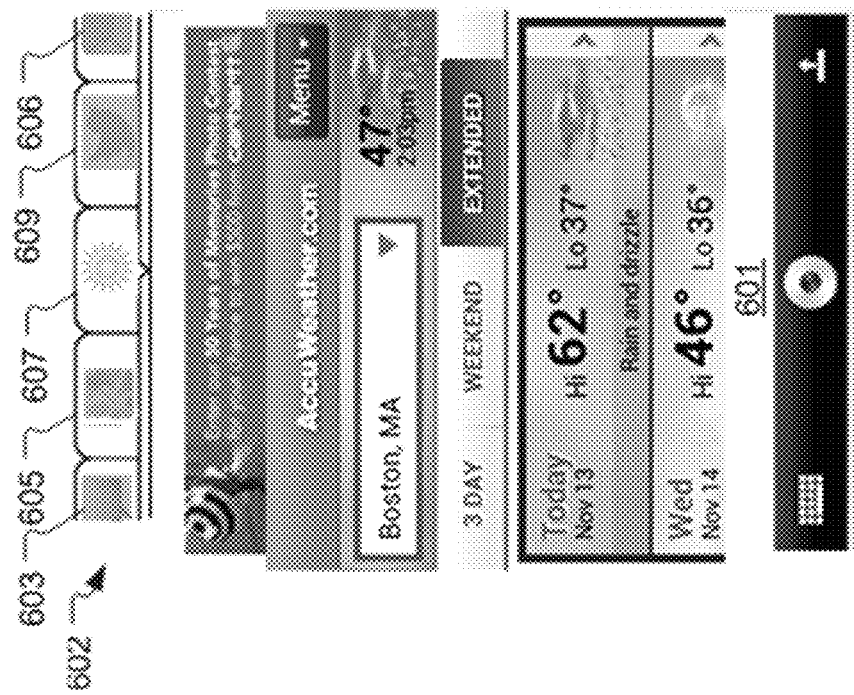
Figure 6E:
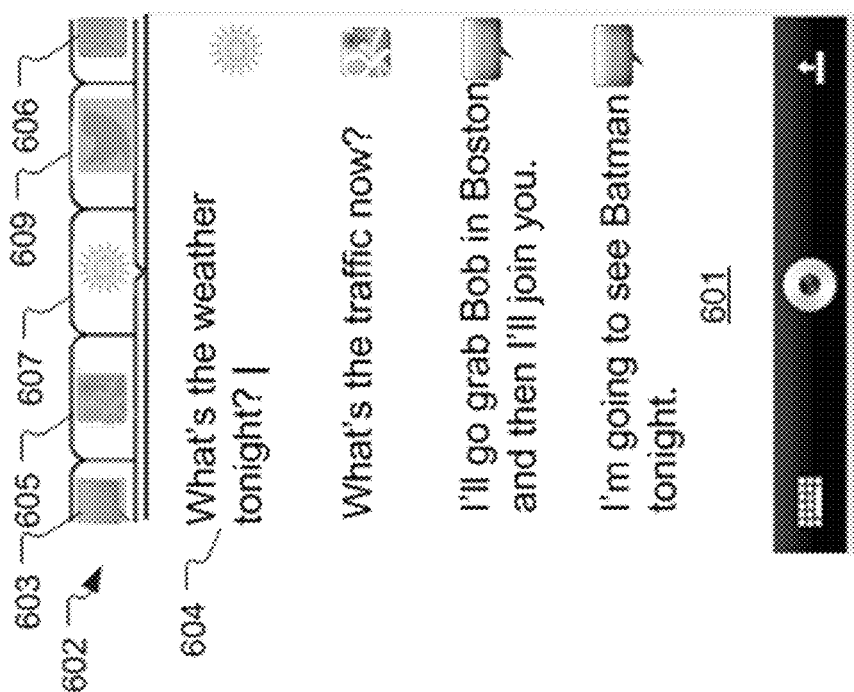

FIG. 4 shows various elements and FIG. 5 shows various functional steps in a hybrid ASR arrangement according to an embodiment of the present invention. A mobile device 400 arrangement conducts multiple parallel natural language dialogs with a user via a user interface 301 and multiple different dialog applications using automatic speech recognition (ASR) and associated local dialog data. The user interface 301 has multiple application selection tabs 302 for user selection of a given active dialog application 304 to interact with the user in a natural language dialog. In the specific embodiment shown in FIG. 4, the multiple different dialog applications include local dialog applications 405 on the mobile device 400 and also remote server dialog applications 412 on a remote server 401.

Unknown speech inputs from the user for the given active dialog application 304 are received via the user interface 301, step 501, and processed by an ASR arrangement processes to produce corresponding speech recognition results 305, step 502. In the specific embodiment shown in FIG. 4, a local/remote controller 402 may direct the speech input to a local ASR engine 403 within the mobile device 400 that performs speech recognition using local ASR data 404. In addition or alternatively, the local/remote controller 402 may send the speech signal over a wireless communications network 406 to a remote server 401 having a server ASR engine 407 and server ASR data 408 that performs the speech recognition of the speech input.

A dialog concept module 409 develops dialog concept items from the speech recognition results and stores them along with additional dialog information (such as an indication of the dialog application in which they were originated) in a dialog concept database 410, step 503. A dialog processor 411 accesses dialog concept database information in the dialog concept database 410 and coordinates operation of the ASR engine 407 and multiple dialog applications 405 and/or 412 selected by the user via the application selection tabs 302 on the user interface 301, step 504, to conduct multiple separate parallel natural language dialogs with the user, step 505. The dialog processor 411 may use a domain expert agent for each dialog application 405 and/or 412 to conduct a natural language dialog with the user in a given associated dialog application. The dialog processor 411 may push relevant dialog concept database information 410 to the dialog applications 405 and/or 412 and/or the dialog applications 405 and/or 412 may pull relevant information from the dialog concept database 410.

In the specific embodiment shown in FIG. 4, the dialog processor 411 and dialog concept module 409 and associated dialog concept data 410 are processed by a remote server 401 in a client server arrangement where the mobile device 400 is the local client. In other embodiments where the mobile device 400 has sufficient processing resources, some or all of these functionalities may be performed wholly or in part on the local mobile device 400. That is, depending on the specific circumstances and resources available any or all of the processing functionality may be performed in whole or in part either locally and/or remotely.

FIG. 6 A-F shows screen captures of a user interface 601 in an example use case. In this example, the user initially starts the application and says: "Send a message to John: I'm going to see Batman tonight." As shown in FIG. 6A, the tab-layout 602 appears on the user interface 601 with the SMS composition tab 603 in the center position, Email composition tab 606 on the left, maps application tab 605 on the right, weather application tab 607 on the far right and so on. Each domain-expert tab initially will grab the pertinent information it can use for the first shot interaction. Then while the user edits the recognized text 604 to be sent (by speech dialog interaction or text), any extra parsed content during this further interaction also is sent to the other domain-expert agencies. If the user completes the message saying: "I'll go grab Bob in Boston and then I'll join you," as shown in FIG. 6B, then "Boston" can be seen as a location for a map search, "Bob" can be identified as a contact for some social media websites, and the full text is also appended to the social media "posts" that are prepared in the social media tabs. So if the user next asks "What's the traffic now?" as shown in FIG. 6C, the system switches to the maps application tab 605 and uses "Boston" from the previous interaction as the locus for the map search and switches the display in the user interface 601 one tab to the right to the maps application tab 605 populated with current traffic information. FIG. 6D. If the user then continues interactions adding more content to another application, the user interface 601 displays each block of collected recognition text 604 with an icon identifying which application tab was used (see FIG. 6C). The user can delete any such text block by swiping it out of the user interface display 601.

The applications that can't use the specific information collected as the conversation goes on will grey themselves out in the tab-layout 602. For example, once the concept "Boston" has been registered in FIG. 6B, the user could speak to the corresponding tab for that concept and as in FIG. 6C: "What's the traffic now?" That specific query would be determined by NLU and dialog processing to be irrelevant to all other tabs (such as SMS, email, etc.) and so should not show up in them.

If the user would like to bring a tab that was not activated from the beginning, he can do a long press on the tab-layout 602 and would see a popup listing all the available agencies. He could then activate a specific domain-expert agency who would receive all information from previous interactions. Some tabs could compute values and inject them into a concept cloud for use by other domain experts or other applications. For example, if the user requests: "What is the weather tonight?" in FIG. 6E, then using the information from the previous interactions, the new weather concept already has a date (tonight) and a location (Boston) and so the weather application tab 607 displays in the user interface 601 weather information based on those existing concepts and information, FIG. 6F.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
receiving first recognized text corresponding to first speech input from a user;
displaying a first tab of a user interface, the first tab corresponding to a first application, wherein the first tab comprises the first recognized text with an icon associated with the first application;
receiving second recognized text corresponding to second speech input from the user;
displaying, responsive to the first speech input and the second speech input, a second tab of the user interface, the second tab corresponding to a second application, wherein the second application is selected based on the second speech input;
receiving third recognized text corresponding to third speech input from the user; and
displaying the first tab of the user interface, wherein the first tab further comprises the second recognized text with an icon associated with the second application and the third recognized text with the icon associated with the first application.

2. The method of claim 1, wherein the first application comprises a text messaging application and the second application comprises an email application, a social media application, a weather application, or a map application.

3. The method of claim 1, further comprising receiving the first speech input from the user by conducting a natural language dialog with the user by a domain expert agent coordinating with a dialog processor.

4. The method of claim 3, wherein the dialog processor pushes information stored in a dialog concept database to the first application and the second application.

5. The method of claim 1, wherein the first tab of the user interface and the second tab of the user interface are configured to allow the user to enter input.

6. A method comprising:
receiving first speech input from a user;
determining a first recognized text corresponding to the first speech input;
storing, in a dialog concept database and based on the first speech input, a first dialog concept item and an associated first indicator of a first application;
displaying a user interface for the first application, the user interface for the first application comprising the first recognized text with the first indicator;
receiving second speech input from the user;
determining a second recognized text corresponding to the second speech input;
storing, in the dialog concept database and based on the second speech input, a second dialog concept item and a second indicator of a second application corresponding to the second dialog concept item;
receiving third speech input from the user;

determining a third recognized text corresponding to the third speech input;

storing, in the dialog concept database and based on the third speech input, a third dialog concept item and a third indicator of a third application corresponding to the third dialog concept item; and modifying the user interface for the first application to further comprise the second recognized text with the second indicator and the third recognized text with the third indicator.

7. The method of claim 6, wherein the first application is a text messaging application, the second application is an email application, a social media application, a weather application, or a map application, and the third application is an email application, a social media application, a weather application, or a map application.

8. The method of claim 6, wherein one or more dialog concept items are pushed from the dialog concept database to the first application, the second application, and the third application.

9. The method of claim 6, wherein one or more dialog concept items are pulled from the dialog concept database by the first application, the second application, and the third application.

10. The method of claim 6, further comprising:
receiving a selection to delete the first recognized text, the second recognized text, or the third recognized text; and
modifying the user interface based on the selection.

11. The method of claim 10, wherein receiving the selection to delete the first recognized text, the second recognized text, or the third recognized text comprises receiving an indication that the user swiped the first recognized text, the second recognized text, or the third recognized text.

12. The method of claim 6, further comprising displaying a second user interface for the second application.

13. The method of claim 6, further comprising displaying a third user interface for the third application.

14. A method comprising:
receiving first speech input from a user;
determining a first recognized text corresponding to the first speech input;
storing, in a dialog concept database and based on the first speech input, a first dialog concept item with an associated first indicator of a first application in which the first speech input originated;
displaying a plurality of tabs, a first tab of the plurality of tabs having a user interface corresponding to the first application, the user interface comprising the first recognized text with the first indicator;
receiving second speech input;
determining a second recognized text corresponding to the second speech input;
storing, in the dialog concept database and based on the second speech input, a second dialog concept item with an associated second indicator of a second application; and
modifying the user interface to further display the second recognized text with the second indicator.

15. The method of claim 14, wherein receiving the first speech input from the user comprises conducting, by a domain expert, a natural language dialog with the user.

16. The method of claim 14, wherein one or more dialog concept items are pushed from the dialog concept database to the first application and the second application.

17. The method of claim 14, wherein one or more dialog concept items are pulled from the dialog concept database by the first application and the second application.

* * * * *